United States Patent Office 2,787,627
Patented Apr. 2, 1957

2,787,627

PROCESS OF PREPARING TRIALKYLHALO-GENOSILANES

Mamoru Kuriyagawa, Tokyo, and Makoto Kumada, Obama-shi, Fukui-ken, Japan, assignors to Tokyo Shibaura Electric Co., Ltd., Kanagawa-ken, Japan No Drawing. Application September 8, 1953, Serial No. 379,052

Claims priority, application Japan September 12, 1952

7 Claims. (Cl. 260—448.2)

This invention relates to a process of preparing trialkylhalogenosilanes and more particularly to a process of preparing trialkylhalogenosilanes from hexaalkyldisilanes.

Normally used as trialkylhalogenosilanes are chlorosilanes, bromosilanes and iodosilanes having trimethyl, dimethylethyl, methyldiethyl and triethyl radicals, respectively. This invention is intended to obtain with ease such pure trialkylhalogenosilanes. Among hexaalkyldisilanes which are the raw materials in the present invention, only hexamethyldisilane has been experimentally produced in a small amount but its use is not known at all. The inventors of this invention suggested in Japanese application No. 14,441 filed on September 12, 1952, which corresponds to copending application U. S. Serial No. 379,059, filed on even date herewith a process of preparing hexaalkyldisilane from a residue after fractionally distilling alkyl silicon halide off which is produced by the direct method set forth in U. S. Patent Nos. 2,380,995, 2,380,996 and 2,380,997. This invention is also to obtain trialkylhalogenosilanes from hexaalkyldisilanes obtained by said process. However, it is needless to say that this invention can be applied to hexaalkyldisilanes prepared not only by said process but also by any other processes.

The hitherto existing processes of preparing trimethylchlorosilane, trimethylbromosilane and trimethyliodosilane as trialkylhalogenosilanes are summarized as follows:

(1) Trimethylchlorosilane is prepared from silicon tetrachloride and a Grignard reagent, and the reaction involves $$SiCl_4 + 3MeMgCl \rightarrow Me_3SiCl + 3MgCl_2$$

As this reaction is one of consecutive competitive reactions, $MeSiCl_3$, $Me_2SiCl_2$ and $Me_4Si$, etc. are produced simultaneously. Therefore, the yield is low and a large amount of Grignard reagent must be used, resulting in a high cost. Further, it is difficult to fractionate ether and the objective substance.

(2) The process wherein ammonium chloride is made to react with a substance obtained from sulfuric acid and trimethylsilicon-ethyl ester $Me_3SiOEt$, which is prepared by the reaction of a Grignard reagent with tetraethylsilicon ester removes the disadvantages in process 1 and yields pure products. However, it is a very long detour.

(3) In the process of preparing $Me_3SiCl$ by a reaction of silicon chlorides ($MeSiCl_3$ or $Me_2SiCl_2$) having one or two methyl radicals with aluminum, zinc, etc. in the gaseous phase, it is difficult to separate the product as in process 1 and the yield is low.

(4) In the process wherein a Grignard reagent is made to react with silicochloroform and then chlorinating the product as shown by the formula:

$$HSiCl_3 + 3MeMgCl \longrightarrow Me_3SiH \xrightarrow{Cl_2} Me_3SiCl + HCl$$

the yield is low at 30 to 40%.

(5) In the process by the so-called "direct method," the reaction shown by the formula $$MeCl + Si(Cu) \rightarrow Me_3SiCl$$

occurs as an auxiliary reaction when $Me_2SiCl_2$ is produced as an object. Therefore, the yield is only 2 to 20%. If silicon tetrachloride $SiCl_4$ is by-produced, fractionation will be very difficult. It is reported that there has been no case of obtaining any favorable yield by promoting the reaction of producing this $Me_3SiCl$.

(6) The process of obtaining trimethylchlorosilane, trimethylbromosilane or trimethyliodosilane, respectively, by reacting ammonium chloride or ammonium bromide with hexamethyldisiloxane dissolved in sulfuric acid.

(7) The process wherein phosphorus tribromide is made to react with hexamethyldisiloxane:

$$Me_3SiOSiMe_3 + PBr_3(+FeCl_3.6H_2O) \rightarrow Me_3SiBr$$

(8) The process wherein trimethylphenylsilane is brominated or iodinated:

$$Me_3SiC_6H_5 + Br_2 \rightarrow Me_3SiBr$$

$$Me_3SiC_6H_5 + J_2 \rightarrow Me_3SiI$$

This is not an industrial process because the raw material is too expensive.

The literature in respect of the above processes 1 to 8 is listed in the following:

(1) Gilliam and Sauer: J. Am. Chem. Soc., vol. 66, p. 1793 (1944).

(2) (a) Di Giorgio, Strong, Sommer and Whitmore: J. Am. Chem. Soc., vol. 68, p. 1380 (1946). (b) Pray, Sommer, Goldberg, Kerr, Di Giorgio and Whitmore: J. Am. Chem. Soc., vol. 70, p. 433 (1948). (c) Gilliam, Meals and Sauer: J. Am. Chem. Soc., vol. 68, p. 1161 (1946).

(3) Hard: J. Am. Chem. Soc., vol. 67, p. 1545 (1945).

(4) (a) Taler: J. Am. Chem. Soc., vol. 66, p. 842 (1944). (b) Slinwinski and Muller: Chem. Tech. (Berlin), vol. 3, p. 293 (1951).

(5) (a) Gilliam, Meals and Sauer: J. Am. Chem. Soc., vol. 68, p. 1161 (1946). (b) Sauer and Hadsel: J. Am. Chem. Soc., vol. 70, p. 4254 (1948). (c) Sauer and Hadsel: J. Am. Chem. Soc., vol. 70, p. 4258 (1948).

(6) and (7) Refer to (2) (a) and (c) above mentioned.

(8) Bygdén: Berichte der Deutchen Chemischen Gesellschaft, vol. 40, p. 2274 (1907).

An object of this invention is to economically and easily obtain trialkylhalogenosilanes which are important for manufacturing organosilicon compounds.

Another object of this invention is to obtain in favorable yields pure trialkylhalogenosilanes from hexaalkyldisilanes.

A further object of this invention is to develop new uses of hexaalkyldisilanes.

It is known to halogenate hexaalkyldisiloxane as shown in processes 6 and 7 in the above. However, in such a case, halogenation of hexaalkyldisiloxane occurs at the oxygen linkage of

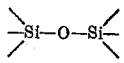

whereas, in the present invention, halogen reacts directly on the silicon atom by cutting off the disilane linkage. In this respect, the reactions are entirely different from each other.

The halogenation in this invention may be effected either by directly reacting halogen with hexaalkyldisilane or by using a halogen containing compound such as, for example, thionyl chloride.

This invention shall now be explained in detail with reference to examples wherein halogen or a compound containing it alone is made to react with hexamethyldisilane Me₃Si—SiMe₃.

Example 1

84 g. of hexamethyldisilane of a boiling point of 111 to 112° C. diluted with 150 cc. of carbon tetrachloride were put into a three-neck flask provided with an agitator, reflux cooler and gas inlet tube. The air in the flask was first replaced by nitrogen or other inert gas and then dry chlorine gas was introduced into the flask under cooling. When the liquid became yellow and chlorine gas was no longer absorbed, the flask being filled with said gas, the introduction of the gas was stopped. The flask was gradually heated up to 40° C. and excess chlorine was driven out of the system. Thereafter, the contents were fractionally distilled in a packed column having twenty theoretical plates. The fraction distilled out at 55 to 58° C. or specifically at 57° C. was trimethylchlorosilane Me₃SiCl and the yield was almost quantitative. That is to say, the comparison of the values of analysis of chlorine for $C_3H_9SiCl$ were as follows: Calculated, 32.6%. Found, 32.3%.

Example 2

15.0 g. (0.103 mole) of hexamethyldisilane were put into a round-bottom flask of about 100 cc. capacity provided with a tap funnel and a glass tube communicating with a container filled with calcium chloride. 16.0 g. (0.1 mole) of dry bromine were contained in said tap funnel and were dropped into the flask. At this time, a very severe reaction occurred, accompanied by decoloration of bromine and heat generation. Therefore, at first, the flask was cooled with running water, while the dropping of bromine was started. After about 1 cc. was dropped, the outside of the flask was cooled with ice. (If it had been cooled with ice from the first, hexamethyldisilane would have been frozen.) When the dropping of bromine was completed, in about an hour, the reaction mixture was light yellow. Then, when the reaction product was rectified, almost all the liquid was distilled out at 79.6 to 80.0° C. This fraction was trimethylbromosilane, Me₃SiBr. There was almost no residue. The yield was 29.3 g. and the percentage of yield was 93.4%. When the analysis values of bromine content in trimethylbromosilane for $C_3H_9SiBr$ were compared, it was found that the found value was 52.2% as against the calculated value of 52.3%. This was obviously the same substance as trimethylbromosilane shown in (2) (b) and (c) of the above enumerated literature.

The value of the bromine content as found by hydrolyzing this trimethylbromosilane coincided with the theoretical value. Trimethylbromosilane is an important material for replacing the trimethyl-silyl radical or adding the trimethyl-siloxyl radical in organic compounds and silicon compounds.

Example 3

A solution of 14 cc. of dry bromine in 20 cc. of bromobenzene was gradually dropped with agitation under ice cooling into a solution of 54.7 g. (0.375 mole) of hexamethyldisilane dissolved in 100 cc. of bromobenzene contained in a 250 cc. three-neck flask provided with an air-tight agitator, reflux cooler and tap funnel through said funnel in the course of two hours. When the reaction product was fractionally distilled by means of the above mentioned fractionally distilling tower for rectification, 95.5 g. (0.625 mole) of trimethylbromosilane were obtained at a boiling point of 78 to 83° C.

Example 4

When a fraction at a boiling point of 150 to 160° C. obtained by distilling the product produced by passing methylchloride onto a copper-silicon contact mass by the direct method was ethylated, that is, by the Grignard reaction with the addition of ethyl magnesium bromide containing sufficient ethyl radicals to replace the chlorine content in said distilled fraction, trimethyltriethyldisilane was obtained. A solution of 15 g. (0.08 mole) of the thus obtained trimethyltriethyldisilane diluted with 30 cc. of ethyl bromide was placed in a flask such as was mentioned in the above examples and was made to react therein with the addition of a solution of 4 cc. of dry bromine dissolved in 16 cc. of ethyl bromide. After the addition, the reaction mixture was boiled and refluxed on a hot water bath for about an hour and was then fractionally distilled by means of a Fenske fractionally distilling tower. As a result, the following main fractionally distilled substances A and B were obtained:

| | Boiling Point (° C.) | Yield (cc.) | $d_4^{20}$ | Br Content (percent) |
|---|---|---|---|---|
| A | 110–113 | 8.8 | 1.188 | 45.6 |
| B | 139–140 | 9.0 | 1.131 | 44.5 |

Fraction A corresponds to dimethylethylbromosilane obtained as a by-product in Lewis' experiment [J. Am. Chem. Soc., vol. 69, p. 717 (1947)] of reacting dimethyldichlorosilane with ethyl magnesium bromide whose boiling point was observed to be 110.4° C. Fraction B corresponds to methyldiethylbromosilane which Lewis and Newkirk [J. Am. Chem. Soc., vol. 69, p. 701 (1947)] pointed out to have a boiling point of 140.9° C. and a calculated value of 44.1% of bromine.

Example 5

When a mixture of 11.0 g. (0.075 mole) of hexamethyldisilane and 19.0 g. (0.075 mole) of iodine was put into a 500 cc. capacity round-bottom flask and was slightly heated with a reflux cooler attached to the flask, a reaction occurred rapidly, heat was generated and severe reflux took place in the cooler. When, after being boiled on an oil bath under refluxing for two hours, the contents were put into a distilling apparatus provided with a Fenske fractionally distilling tower and were distilled, almost all of them were distilled out at 106 to 107° C. The product was transparent at first but was immediately colored red to brown. It was trimethyliodosilane Me₃SiI, being a heavy liquid severely fuming in the air. The results of quantitative analysis for iodine by means of hydrolysis almost coincided with the theoretical values. That is to say, the comparison of the values of analysis for iodine for $C_3H_9SiI$ showed that the found value was 62.9% as against the calculated value of 63.5%. The yield was 28 g. (0.14 mole) and the percentage of yield was 93%.

Trimethyliodosilane is a useful material for introducing Me₃Si and Me₃SiO radicals.

We claim:

1. A process for preparing trialkylhalogenosilane which comprises subjecting a hexaalkyldisilane to the action of a halogen in the dry state, said halogen being selected from the group consisting of Cl, Br and I.

2. A process for preparing trimethylchlorosilane which comprises subjecting a hexamethyldisilane to the action of a dry chlorine gas.

3. A process for preparing trimethylchlorosilane which comprises fractionally distilling at 55 to 58° C. the solution produced by introducing chlorine gas in an inert atmosphere into a solution of hexamethyldisilane diluted with carbon tetrachloride and agitating and cooling the mixture until reaction is completed.

4. A process for preparing trimethylbromosilane which comprises fractionally distilling at 78 to 83° C. the solution produced by dropping bromine into hexamethyldisilane contained in a container and reacting them while they are cooled with ice.

5. A process for preparing a mixture of dimethylethylbromosilane and methyldiethylbromosilane which comprises adding bromine dissolved in ethyl bromide to trimethyltriethyldisilane, and then boiling and refluxing the reaction mixture.

6. A process for preparing dimethylethylbromosilane and methyldiethylbromosilane separately which comprises adding a solution of bromine in ethylbromide to a solution of trimethyltriethyldisilane diluted with ethylbromide, reacting the bromine and trimethyltriethyldisilane and distilling the product thus obtained to yield dimethylethylbromosilane at 110 to 130° C. and methyldiethylbromosilane at 139 to 140° C., respectively.

7. A process for preparing trimethyliodosilane by fractionally distilling at 106 to 107.5° C. the product obtained by boiling for reaction a mixture of hexamethyldisilane and iodine.

References Cited in the file of this patent

UNITED STATES PATENTS 2,598,435    Mohler _____ May 27, 1952

OTHER REFERENCES

Gilman et al.: "Jour. Am. Chem. Soc.," vol. 75 (August 1953), pp. 3762–5.